Aug. 28, 1951 LA VERN H. BECKBERGER 2,566,159
PROCESS AND APPARATUS FOR EFFECTING CHEMICAL
REACTIONS WITH SOLID CATALYST PARTICLES
Filed June 21, 1947
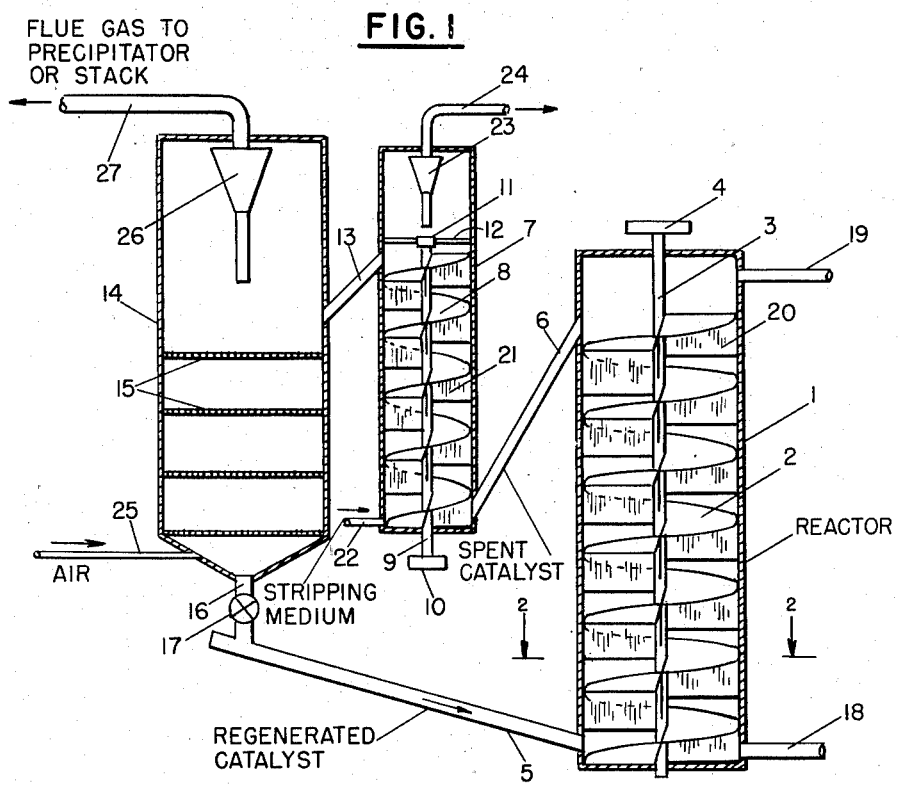
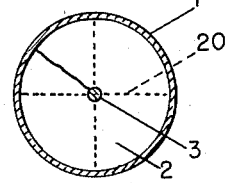
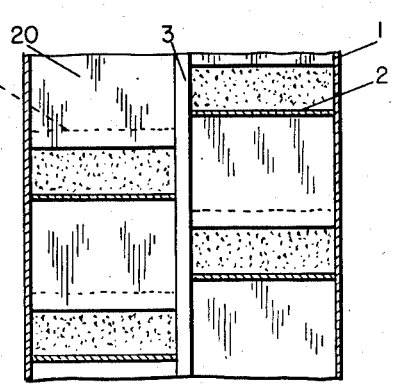
INVENTOR
LAVERN HERBERT BECKBERGER
BY
Pennie, Edmonds, Morton & Barrows
ATTORNEYS Patented Aug. 28, 1951

2,566,159

UNITED STATES PATENT OFFICE 2,566,159

PROCESS AND APPARATUS FOR EFFECTING CHEMICAL REACTIONS WITH SOLID CATALYST PARTICLES

La Vern Herbert Beckberger, East Chicago, Ind., assignor to Sinclair Refining Company, New York, N. Y., a corporation of Maine Application June 21, 1947, Serial No. 756,284

3 Claims. (Cl. 23—1)

This invention relates to the pyrolytic conversion of hydrocarbons and, more particularly, to pyrolytic conversion processes involving the use of a solid catalyst.

The invention provides an improved method of effecting contact between the hydrocarbon vapors to be converted and the hot catalyst in the conversion zone and also improved apparatus especially adapted to the carrying out of the process. The invention is likewise applicable to the stripping of hydrocarbons from the spent catalyst by passing a stripping medium, for instance, steam, through the catalyst, and for effecting regeneration of the catalyst by passing air in contact therewith, whereby the carbonaceous deposit formed on the catalyst during conversion is burned off.

In one method of operation previously proposed, the hydrocarbons to be converted are continuously passed in vapor phase upwardly through a downwardly gravitating bed of catalyst in granular or pelleted form in a vertically elongated conversion chamber, the catalyst being continuously withdrawn from the lower end of the chamber, regenerated and hot regenerated catalyst returned to the upper end of the chamber. Such operations have entailed expensive and troublesome mechanical elevator means for conveying the catalyst from the lower end of the conversion chamber to the top of the regenerating chamber and again from the lower end of the regenerating chamber to the top of the conversion chamber. Difficulties have also been experienced in effecting uniform contact between the hydrocarbon vapors and the catalyst by reason of the tendency of the vapors to channel upwardly through the bed of catalyst. Similar difficulties have been experienced in the stripping and regeneration of the catalyst.

A further serious difficulty in operations of the type described has been the uneven movement of the catalyst through the respective contact zone. This has resulted in the hammering or serious vibration of the respective chambers.

Operations of the type described are subject to the further objection that contact chambers of great height are required, which adds greatly to the cost of necessary apparatus and further aggravates elevator problems and costs.

The present invention provides an improved method and means of operation whereby these difficulties are minimized.

In accordance with my present invention, as applied to the conversion zone, for instance, the hydrocarbon vapors are caused to pass through the catalyst bed in a restricted spiral course, thus materially elongating the path of the vapors through the catalyst bed without materially adding to the height of the catalyst bed, or else effecting a path of equal length with material reduction in the height of the reactor. The catalyst is likewise conveyed through the reaction zone along a spiral path, for instance, by means of a mechanical conveyor, advantageously a helical screw conveyor, the flights of the helix delineating the path of both the catalyst and the vapors through the reaction zone.

The catalyst, advantageously freshly regenerated catalyst, is introduced into the lower end of the reactor or conversion chamber and is carried in a helical path upwardly through the chamber and is withdrawn from the upper end thereof. The hydrocarbon vapors to be converted may be passed either concurrently with, or countercurrent to, the catalyst.

The invention will be further described and illustrated with reference to the accompanying drawings—

Figure 1 of which represents conventionally and somewhat diagrammatically a vertical sectional view of an apparatus;

Figure 2 represents a horizontal sectional view of the reactor of Figure 1 along the lines 2—2, and Figure 3 is a fragmentary vertical elevation, somewhat enlarged, of a section of the reactor of Figure 1.

The apparatus indicated by the reference numeral 1 of Figure 1 is a vertically elongated cylindrical chamber, closed at its upper and lower ends and provided interiorly with a helix 2 supported by the shaft 3 which is driven by any suitable means not shown in the drawing, through pulley 4.

Catalyst is passed through conduit 5 into the lower end of chamber 1 and is carried upwardly by the screw conveyor into the upper portion of the chamber and passes therefrom through conduit 6 into the lower end of the stripping chamber 7. The stripping chamber is likewise provided with a helix 8 supported by shaft 9 and driven through pulley 10, the upper end of the shaft being supported by bearing 11 which, in turn, is supported by a spider 12.

The catalyst is conveyed upwardly through the stripping chamber by the screw conveyor and passes from the upper end thereof through conduit 13 into the regenerating chamber 14.

The regenerator 14 may likewise be provided with a screw conveyor, such as shown in reactor 1, but, in the drawing, is provided interiorly with a plurality of vertically spaced perforated plates, or grids, 15 through which the catalyst gravitates downwardly into the lower end of the regenerator, from whence it passes through regenerated catalyst leg 16 into the upper end of conduit 5, at a rate controlled by valve 17, and is returned to the lower end of the reactor.

In operation, the hydrocarbon charge oil, either in mixed or vapor phase, may be charged to the lower end of the reactor through line 18. Any liquid present is quickly vaporized by contact with the hot catalyst and the hydrocarbon vapors pass upwardly along the spiral course, delineated by the helix, through the spiral bed of catalyst on the flights of the helix. The hydrocarbon vapors are thus converted by contact with the hot catalyst and the products of conversion passed from the upper end of the reactor through line 19.

As an alternative method of operation, the fresh charge oil may be introduced to the reactor through line 19 and the products of conversion withdrawn through line 18.

In normal operation, the catalyst will be fed to the reactor at a rate such that the space between the flights of the conveyor may not be completely filled with catalyst. To avoid the channelling of the hydrocarbon vapors along the under-surface of the flights without adequate contact with the catalyst, I provide fins 20 projecting downwardly from the under-surface of the flights to a depth below the upper surface of the catalyst bed on the next lower flight. Advantageously, these fins are spaced along the undersurface of the flights at angles of about 90°, as more clearly shown in Figure 2 of the drawings, although the invention contemplates the use of fins at greater or lesser angles and also the absence of fins where the catalyst is fed to the reactor at a rate such that the spaces between the flights are completely filled with catalyst.

Hydrocarbon vapors, products of the conversion, may be passed from the reactor to separating apparatus for the recovery of suspended catalyst and, from thence, to fractionating apparatus, not shown in the drawings, and there fractionated to obtain the desired product by known methods.

The stripper 7 is likewise provided with fins 21 such as described with reference to the reactor. A stripping medium, steam, for instance, is introduced into the lower part of the stripper through line 22 and passes upwardly in a spiral path through the catalyst on the flights of the screw conveyor. Stripping medium and hydrocarbon vapors stripped from the catalyst pass from the upper end of the stripper through a cyclone type separator 23 for the separation of suspended catalyst and, from thence, through line 24 to apparatus not shown for recovering hydrocarbon vapors from the stripping medium.

Air is introduced into the lower end of the regenerator 14 through line 25 and passes upwardly through the downwardly gravitating bed of catalyst, the products of combustion passing from the upper end of the regenerator through cyclone type separator 26, for the separation of suspended catalyst, and, from thence, through conduit 27 to a precipitator, or stack, not shown.

The invention is applicable to processes in which the catalyst is used, either in finely divided, coarse-grained, beaded, pelleted, or microspherical form. It provides a method and means whereby the feed of the catalyst is independent of the feed of the hydrocarbon vapors. In endothermic reactions, heat will be conducted by the screw conveyor from the hot catalyst to the feed stock and in exothermic reactions, heat will be conducted by the screw conveyor from the feed stock to the catalyst. Further heat conveyed by the screw conveyor will tend materially to equalize temperature conditions throughout the reaction. Further, indiscriminate mixing of spent, or partially spent catalyst, with freshly regenerated catalyst, is avoided and thereby catalytic effectiveness and catalyst life improved.

As previously noted, the invention is applicable to various types of conversion reactions and contemplates the use of catalyst known to be effective in the carrying out of the particular operation. Operating conditions are likewise subject to considerable variation, depending upon the particular catalyst employed, the nature and extent of the desired reaction and the characteristics of the feed stock.

In cracking gas oil, for instance, using an alumina-silica type catalyst, the temperature in the reaction zone is, with advantage, maintained within the range of about 750° to 950° F. and the pressure within the range of about 10 to 15 pounds per square inch. In the regenerating zone, a temperature within the range of 900° to 1,150° F., for instance, is usually satisfactory.

In effecting dehydrogenation of butane, for instance, the catalyst may be a chromium oxide on an alumina carrier, the reaction temperature may be within the range of 900° to 1,150° F. and the pressure about 0.1 to 5 atmospheres absolute.

In the amination of low boiling olefins, the reaction temperature may be maintained within the range of 640° to 780° F., advantageously about 700° F., and the pressure within the range of 250 to 1,500 pounds per square inch, advantageously around 500 pounds per square inch. The catalyst may be reduced cobalt oxide, reduced iron oxide, or other known amination catalyst. The ammonia may be introduced with the olefin feed stock, the molar ratio of olefin to ammonia being, with advantage, within the range of 10:1 to 2.5:1. In amination operations of this type, feed stock may be used which contains, say, from 10 to 40% olefins. The space velocity of the feed stock, based on liquid volume of the feed, per volume of catalyst may, with advantage, be within the range of .3 to 2.

I claim:

1. In a process for effecting a chemical reaction wherein a gaseous fluid to be treated is passed in vapor phase in contact with a non-fluidized bed of solid catalyst particles, the steps which comprise forming a vertically disposed spiral bed of catalyst particles in a reaction zone, said spiral bed occupying a portion of the space between the flights of the spiral bed thereby defining a spiral space immediately above the spiral bed, moving said spiral bed vertically upwardly through the reaction zone, passing the gaseous fluid in a spiral path through the spiral bed of catalyst particles and said spiral space immediately above the spiral bed, blocking completely the flow of gaseous fluid through said spiral space at periodic intervals, directing the blocked gaseous fluid downwardly into said spiral bed for contact therewith, withdrawing catalyst particles from the upper end of said reaction zone, and withdrawing the treated gaseous fluid from said reaction zone.

2. The process of claim 1 wherein the gaseous fluid is passed downwardly in a spiral path through the spiral bed of catalyst particles.

3. Apparatus of the type described which comprises a vertically elongated cylindrical chamber, a helical screw conveyor vertically positioned within said chamber, extending over substantially the height of the chamber and of a diameter substantially equal to the inner diameter of the chamber, conduits connected with the upper and the lower ends of the chamber respectively, separate conduit means leading to the lower end of the chamber adapted to the passage of a solid catalyst thereto and conduit means leading from the upper end of the chamber adapted to the withdrawal of catalyst therefrom and vertically positioned fins extending downwardly from the lower surface of the flights of the helical screw conveyor and terminating above the upper surface of the next lower flight.

LA VERN HERBERT BECKBERGER.

REFERENCES CITED

The following references are of record in the file of this patent:

UNITED STATES PATENTS

| Number | Name | Date |
| --- | --- | --- |
| 2,097,084 | Smith | Oct. 26, 1937 |
| 2,265,837 | Harding | Dec. 9, 1941 |
| 2,317,379 | Hemminger | Apr. 27, 1943 |
| 2,319,836 | Weerner | May 25, 1943 |
| 2,370,816 | Schonberg | Mar. 6, 1945 |
| 2,389,399 | Alther | Nov. 20, 1945 |
| 2,418,679 | Utterback | Apr. 8, 1947 |
| 2,419,088 | Putney | Apr. 15, 1947 |
| 2,517,339 | Offutt et al. | Aug. 1, 1950 |

OTHER REFERENCES

Ser. No. 434,440, P. Woog (A. P. C.), published June 1, 1943.